United States Patent [19]
Shiau

[11] Patent Number: 5,911,429
[45] Date of Patent: Jun. 15, 1999

[54] BICYCLE FRAME

[75] Inventor: Daniel Shiau, Tainan City, Taiwan

[73] Assignee: Giant Manufacturing Co., Ltd, Taichung Hsien, Taiwan

[21] Appl. No.: 08/833,606

[22] Filed: Apr. 11, 1997

[51] Int. Cl.$^6$ .................................................. B62K 3/02
[52] U.S. Cl. ................................... 280/281.1; 280/288.4; 297/215.15
[58] Field of Search ............................. 297/215.15, 215.13; 280/281.1, 283, 274, 288.4

[56] References Cited

U.S. PATENT DOCUMENTS

| Re. 13,383 | 3/1912 | Harley | 280/283 |
| 5,308,030 | 5/1994 | Bales | 280/283 X |
| 5,593,168 | 1/1997 | Chou | 280/275 |

FOREIGN PATENT DOCUMENTS

| 2675459 | 10/1992 | France | 297/215.15 |
| 4232655 | 3/1994 | Germany | 297/215.14 |

*Primary Examiner*—Lanna Mai
*Assistant Examiner*—Avraham H. Lerner
*Attorney, Agent, or Firm*—Harness, Dickey & Pierce, P.L.C.

[57] ABSTRACT

A bicycle frame includes a top tube which has a first mounting seat and a second mounting seat spaced apart from the first mounting seat in a longitudinal direction of the top tube, and a seat tube which has first upper and lower ends. The first lower end is pivotally mounted to the first mounting seat. An extension tube is connected to the first upper end for mounting a seat thereon. A telescopic bracket tube is pivotally mounted to the second mounting seat and the first upper end, and is extendable and retractable so as to adjust the position of the seat tube. A plurality of locking members lock the telescopic bracket tube against extension and retraction so as to position the seat tube.

4 Claims, 3 Drawing Sheets

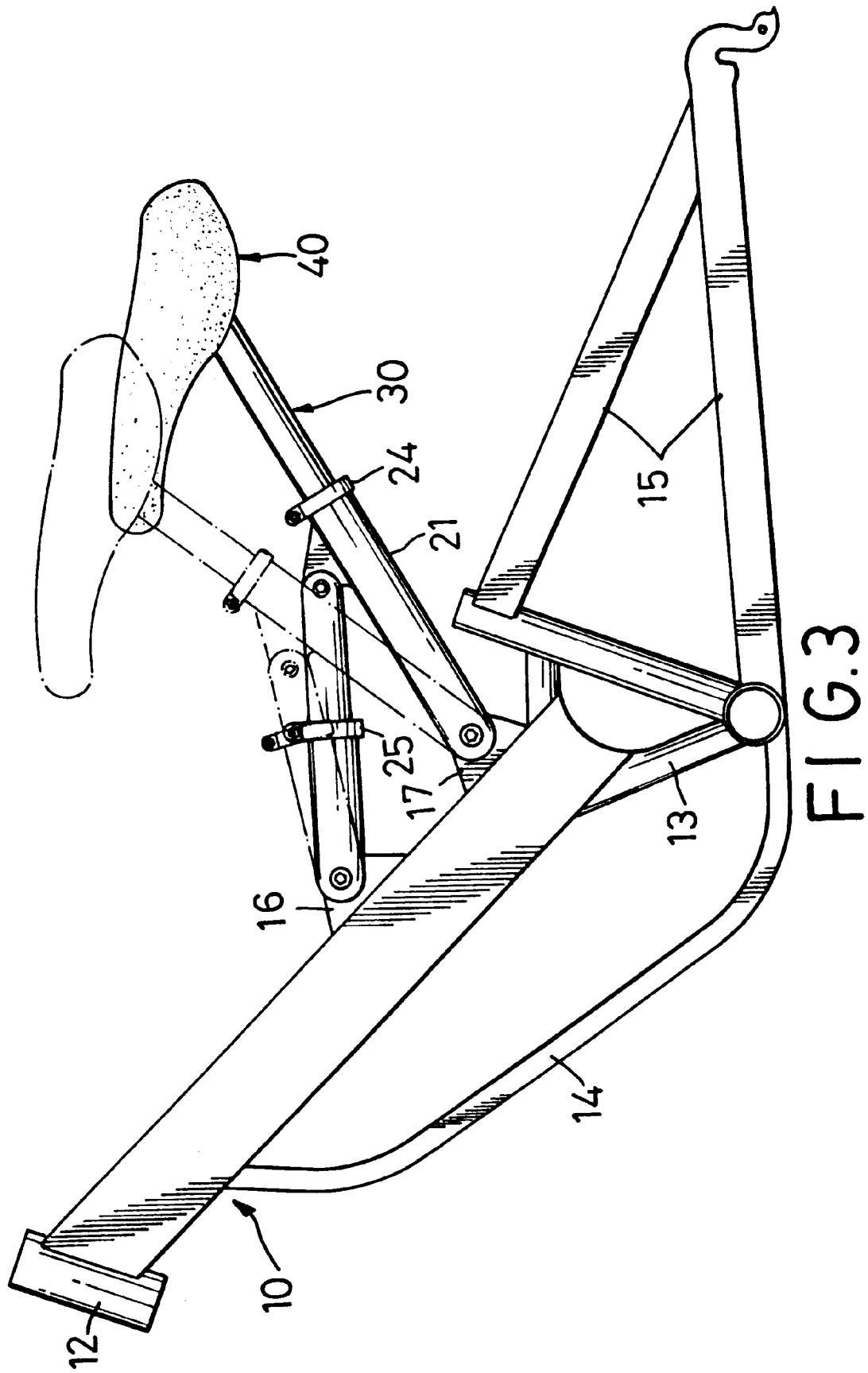

BICYCLE FRAME

BACKGROUND OF THE INVENTION

1. Field of the Invention

This invention relates to a bicycle frame, more particularly to a bicycle frame with a seat that is adjustable in forward, backward, upward and downward directions.

2. Description of the Related Art

A conventional bicycle frame has a fixed seat tube for mounting a seat thereon. Although the seat is extendable and retractable relative to the seat tube so as to adjust the height of the seat, the seat tube can not be moved to adjust the seat forward and backward, thereby resulting in discomfort for some users.

SUMMARY OF THE INVENTION

The main object of the present invention is to provide a bicycle frame which can be easily operated to adjust the position of a seat in forward, backward, upward and downward directions.

According to this invention, a bicycle frame includes a bicycle frame body which has a top tube that has a first mounting seat and a second mounting seat spaced apart from the first mounting seat in a longitudinal direction of the top tube. A seat tube has first upper and lower ends. The first lower end is pivotally mounted to the first mounting seat. A seat is mounted on the seat tube. A telescopic bracket tube has second upper and lower ends. The second lower end is pivotally mounted to the second mounting seat. The second upper end is pivotally connected to the first upper end. The telescopic bracket tube is extendable and retractable so as to adjust the position of the seat tube. A plurality of locking members lock the telescopic bracket tube against extension and retraction so as to position the seat tube.

BRIEF DESCRIPTION OF THE DRAWINGS

Other features and advantages of the present invention will become apparent in the following detailed description of a preferred embodiment of the invention, with reference to the accompanying drawings, in which:

FIG. 3 is a side view illustrating the bicycle frame when the seat thereof is adjusted backward and upward.

DETAILED DESCRIPTION OF THE PREFERRED EMBODIMENT

Figure 1:
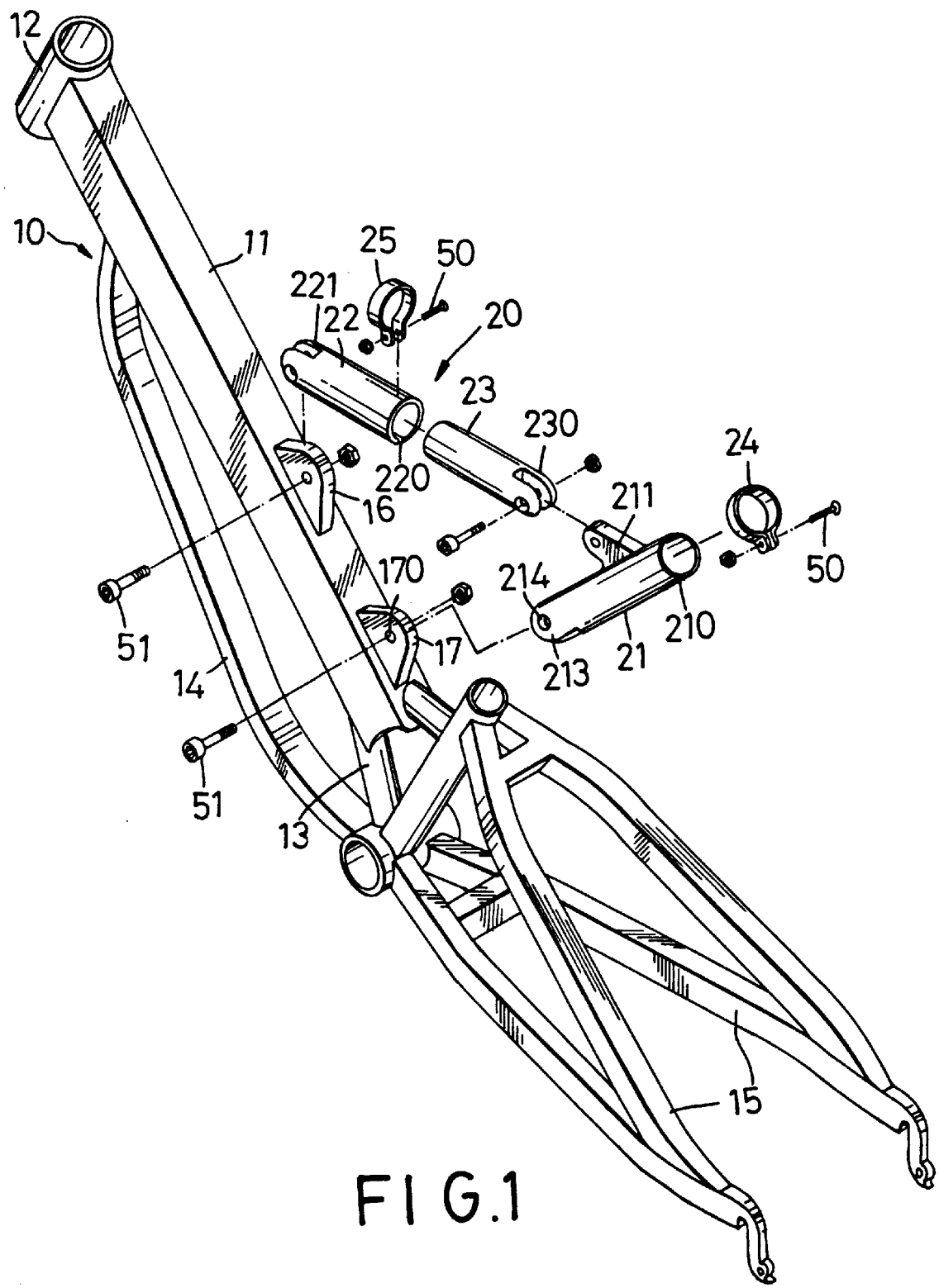
FIG. 1 is an exploded view of a bicycle frame according to the preferred embodiment of the present invention.
Figure 2:
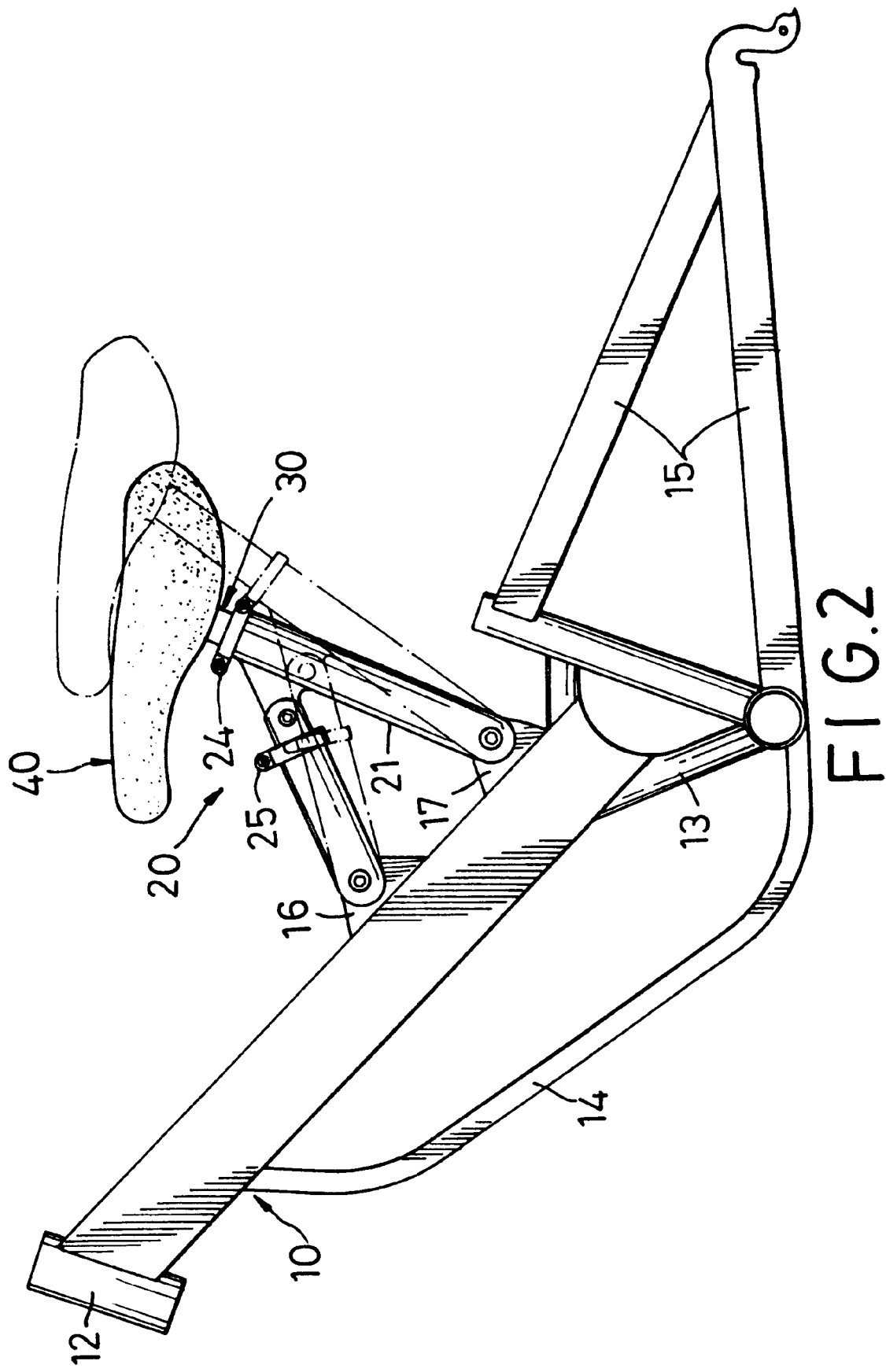
FIG. 2 is a side view illustrating the bicycle frame when a seat thereof is adjusted forward and downward.

Referring to FIGS. 1 and 2, the preferred embodiment of a bicycle frame according to the present invention is shown to comprise a bicycle frame body 10 which has a top tube 11, a head tube 12 that is connected to a front end of the top tube 11 for mounting a front tube and a handle (not shown) thereon, a forked tube 13 which is disposed at a rear end of the top tube 11, a down tube 14 which extends below the top tube 11 toward the forked tube 13, and a rear mounting frame 15 which extends rearward from the forked tube 13 for mounting a rear wheel (not shown) thereon. The top tube 11 has a first mounting seat 17 and a second mounting seat 16 which is spaced apart from the first mounting seat 17 in a longitudinal direction of the top tube 11 and which is in front of the first mounting seat 17.

A seat tube 21 has a forked first lower end 213 which is straddled on the first mounting seat 17. A pivot pin 51 passes horizontally through pivot holes 214 and 170 in the first lower end 213 and in the first mounting seat 17. The seat tube 21 has a first upper end 210 which is split, and an extension tube 30 which is inserted into the first upper end 210. A C-shaped clamp ring 24 is provided around the first upper end 210, and has a pair of lugs which project radially and outwardly from the clamp ring 24. A threaded bolt 50 passes through the lugs and a nut so that the first upper end 210 is clamped tightly against the extension tube 30. A seat 40 is mounted on the extension tube 30. The seat tube 21 is provided with a third mounting seat 211 adjacent to the first upper end 210.

A telescopic bracket tube 20 includes a sleeve tube 22 and an insert tube 23 which is slidably inserted into the sleeve tube 22. The sleeve tube 22 has a split end 220 which is sleeved onto one end portion of the insert tube 23. A C-shaped clamp ring 25 is provided around the split end 220 to lock the insert tube 23 relative to the sleeve tube 22 via a threaded bolt 50. The telescopic bracket tube 20 has a forked second upper end 230 and a forked second lower end 221 which are pivoted respectively to the third mounting seat 211 and the second mounting seat 16 by pivot pins 51. As shown in FIGS. 2 and 3, it is assumed that the bicycle frame is at the position indicated by dotted lines in FIG. 2. When it is desired to adjust the seat 40 downward and forward, the clamp ring 24 is loosened so that the extension tube 30 slides downward into the seat tube 21 to a desired position. The clamp ring 25 is then loosened so that the insert tube 23 slides into the sleeve tube 22, thereby moving the first upper end 210 and the seat 40 forward. Finally, the clamp rings 24 and 25 are locked so as to position the seat 40. Accordingly, when it is desired to adjust the seat 40 upward and backward, as shown in FIG. 3, the clamp rings 24 and 25 are loosened so that the extension tube 30 and the insert tube 23 can extend outward from the seat tube 21 and the sleeve tube 22, respectively.

As illustrated, the bicycle frame 10 according to the present invention can be easily adjusted to move the seat 40 in forward, backward, upward and downward directions by virtue of the extendable and retractable constructions of the telescopic bracket tube 20 and the seat tube 21.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A bicycle frame comprising:

a bicycle frame body having a top tube which has a first mounting seat and a second mounting seat spaced apart from said first mounting seat in a longitudinal direction of said top tube;

a seat tube having first upper and lower ends, said first lower end being pivotally mounted to said first mounting seat;

a seat mounted on said seat tube;

a telescopic bracket tube having second upper and lower ends, said second lower end being pivotally mounted to said second mounting seat, said second upper end being pivotally connected to said first upper end, said telescopic bracket tube being extendable and retractable so as to adjust a position of said seat tube; and means for locking said telescopic bracket tube against extension and retraction so as to position said seat tube.

2. A bicycle frame according to claim 1, wherein said telescopic bracket tube includes a sleeve tube and an insert tube which is slidably inserted into said sleeve tube, said sleeve tube having a split end which is sleeved onto one end portion of said insert tube, said locking means including a clamp ring provided around said split end.

3. A bicycle frame according to claim 1, wherein said seat tube further comprises an extension tube connected to said first upper end of said seat tube, said seat being connected to said extension tube.

4. A bicycle frame according to claim 3, wherein said extension tube is slidably inserted into said first upper end, said seat tube further including a clamp ring to lock said extension tube against movement relative to said seat tube.

* * * * *